March 24, 1970 R. E. HIGHTOWER ET AL 3,501,960
FLUTED PRESSURE TRANSDUCER
Filed Aug. 19, 1968 2 Sheets-Sheet 1
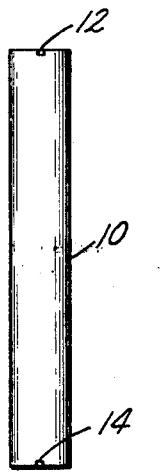
FIG. 1
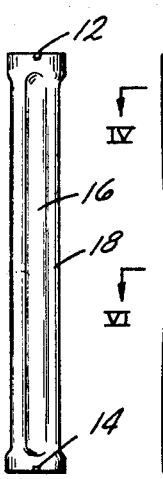
FIG. 3
FIG. 5
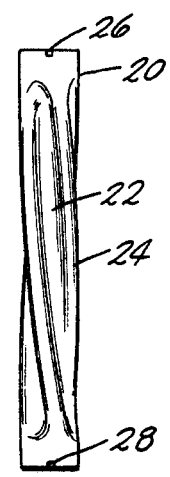
FIG. 7
FIG. 2
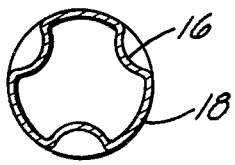
FIG. 4
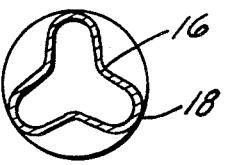
FIG. 6
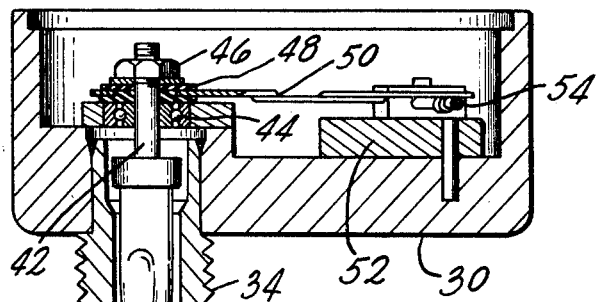
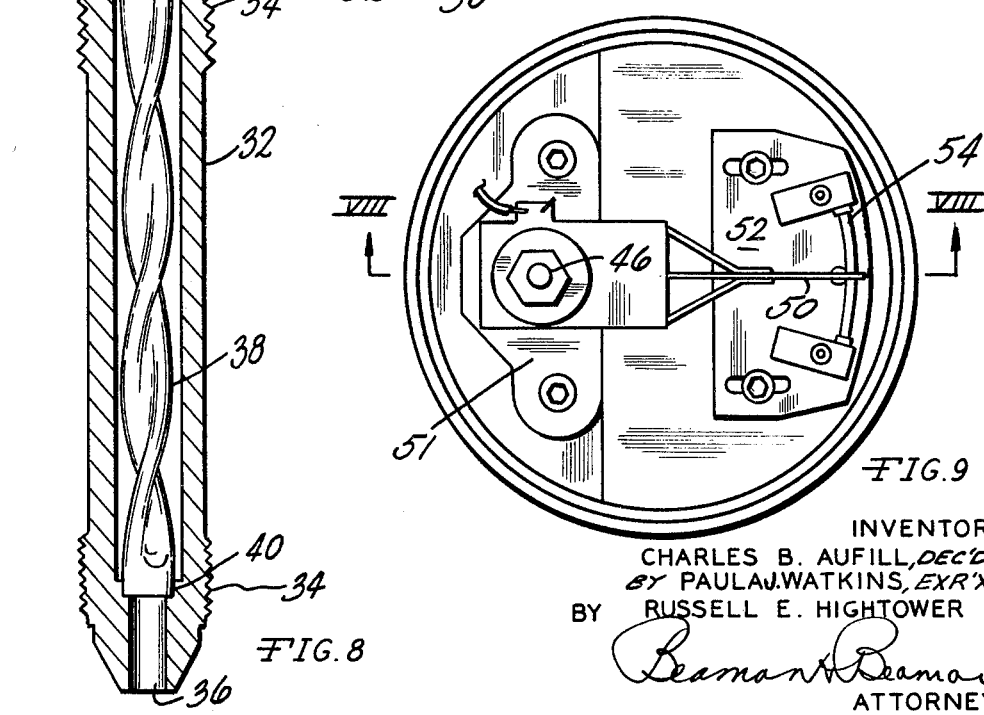
FIG. 8
FIG. 9
INVENTOR
CHARLES B. AUFILL, DEC'D.
BY PAULA J. WATKINS, EXR'X
BY RUSSELL E. HIGHTOWER
Beaman & Beaman
ATTORNEYS

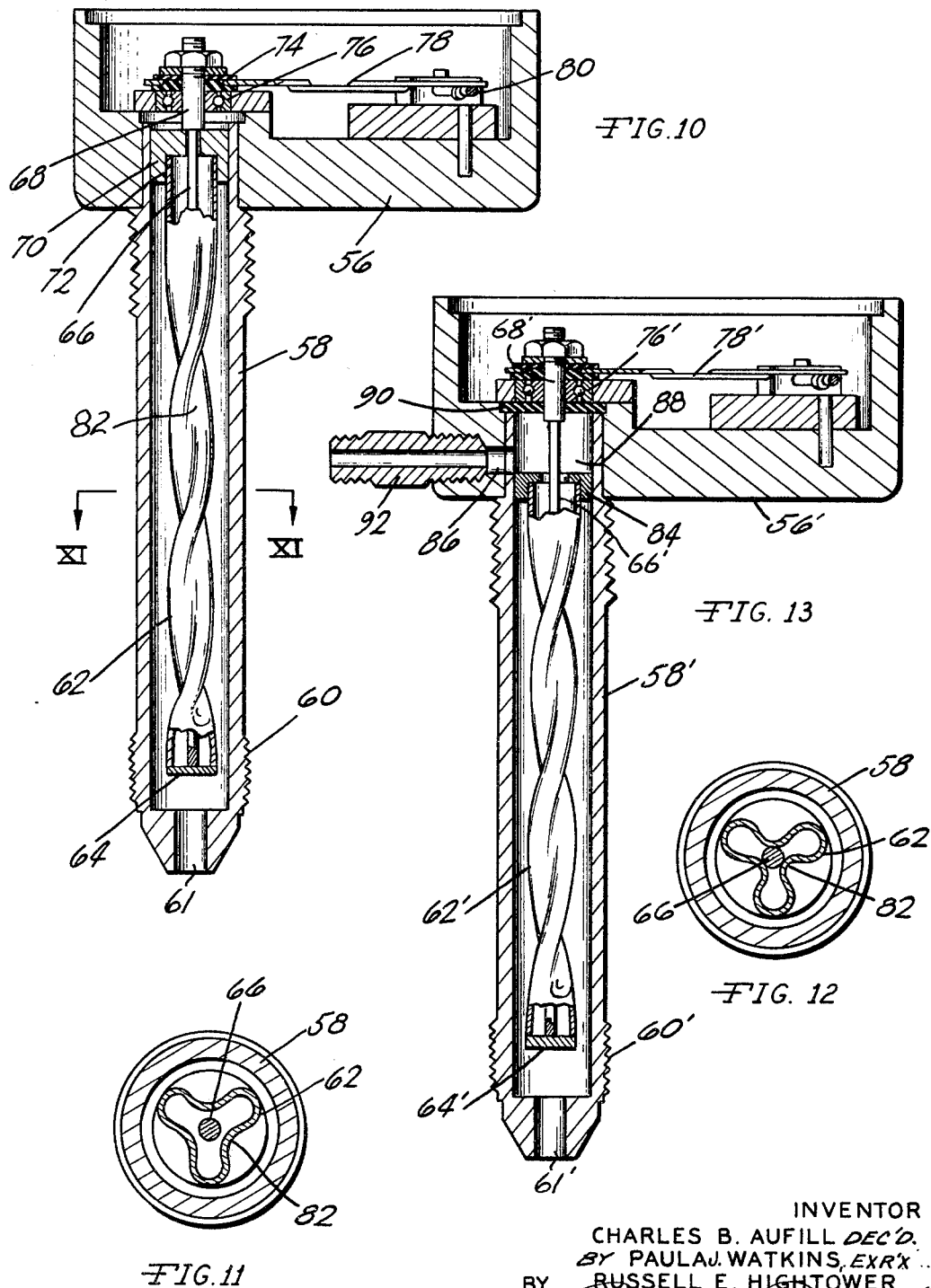

3,501,960
FLUTED PRESSURE TRANSDUCER
Russell E. Hightower, Albuquerque, N. Mex., and Charles B. Aufill, deceased, late of Albuquerque, N. Mex., by Paula J. Watkins, executrix, Albuquerque, N. Mex., assignors to Sparton Corporation, Jackson, Mich., a corporation of Ohio
Filed Aug. 19, 1968, Ser. No. 753,791
Int. Cl. G01l 9/18
U.S. Cl. 73—398    5 Claims

ABSTRACT OF THE DISCLOSURE

The invention relates to a pressure transducer, and a fluted pressure-sensing element therefor, wherein the pressure-sensing element is of a tubular configuration having flutes spirally formed therein whereby a pressure differential acting upon either the interior or exterior wall of the sensing element causes a twisting and angular deflection of the element about its longitudinal axis proportional to the pressure differential. The transducer arrangement in accord with the invention has improved characteristics over the conventional twisted Bourdon tube, such as in increased amount of rotation for a given pressure differential, overpressure capabilities, and decreased hysteresis error.

BACKGROUND OF THE INVENTION

The invention pertains to the field of pressure transducers utilizing pressure sensing elements of a spiraled configuration wherein a pressure differential causes an angular deflection of the element throughout its length which can be measured, or indicated by appropriate apparatus.

Bourdon tube devices have long been utilized to indicate or sense pressures, such as fluid pressures or air pressures, and these tube devices have taken a number of configurations. One configuration that is known consists of a twisted tube design formed by twisting a thin wall tube of an oval or elliptical cross-sectional configuration about its longitudinal axis wherein a spiraled shape is produced. Upon internally pressurizing this type of tube the tube tends to "straighten" or "untwist" producing an angular deflection throughout the axis length of the sensing element which may be measured as an indication of the pressure within the tube.

While this type of device has found a number of successful applications, it is also subject to many limitations. For instance, the given operating pressure range of a single element is rather limited and the physical characteristics of the tube must be substantially modified to accommodate various pressure ranges. Additionally, the angular deflection produced within the operating capabilities of the device are rather limited and motion multiplication and amplification devices often are required in order to produce an effective transducer utilizing this type of sensing element. Additionally, it is difficult to form a uniform twist in a twisted Bourdon tube and it is most difficult to maintain a linear modulus of elasticity throughout the operating range.

Another problem which the twisted Bourdon tube pressure-sensing element encounters is that of "overpressurization" wherein the interior of the sensing element is subjected to pressures higher than that for which it was designed and the tube becomes "inflated" beyond the elastic limit of the tube material, causing the tube to deform and untwist rendering the sensing element and its associated apparatus inoperative.

SUMMARY OF THE INVENTION

The invention pertains to a pressure transducer and the sensing element therefor, wherein the sensing element has flutes, or grooves, spirally formed therein, rather than the spiraled configuration being formed by the twisting action of an oval or elliptical tube. In the practice of the invention the cross section of the original tube may be circular or noncircular. The flutes are formed in the tube material from the wall thereof, and may be formed by any conventional manufacturing technique.

Preferably, the pressure-sensing element of the invention is formed of a tube having molecular stress lines which extend substantially parallel to the axis of the tube, and the flutes are spirally formed in the tube as to be obliquely related to the stress lines. This type of construction provides the best physical characteristics of the inventive concept and overcomes many of the problems previously encounted with twisted type Bourdon tube sensing devices.

Another object of the invention is to produce a pressure transducer which is self-limiting with respect to overpressure capability and automatically prevents the pressure-sensing element from being damaged due to excessive pressures being applied thereto. In the practice of this concept, the pressure-sensing element is subjected to an exterior pressure which is to be sensed or indicated. Resistance of overpressure results from the presence of a shaft coaxially extending through the pressure-sensing element against which the flutes of the element bear upon maximum pressures being applied to the element walls. The shaft will limit the radial contraction of the flutes and the twisting of the element, and thereby prevent movement of the element under excessive pressures prior to reaching the limit of the elasticity of the element material.

By forming the pressure-sensing element with flutes, improved temperature characteristics are obtained over conventional twisted constructions. Additionally, a greater angular deflection takes place about the axis of the pressure-sensing element under given pressure conditions for identical lengths as compared with conventional constructions and a more uniform rate of twist occurs throughout the element length. Additionally, decreased hysteresis error occurs and increased life results due to lower stresses being produced in the tube during manufacture and operation.

Manufacturing of a fluted transducer pressure-sensing element requires less critical tolerances during the final assembly, requires a reduced number of parts in the completed transducer and a wide range of choices of materials can be made as soldering and assembly procedures are simplified and with less scrap.

By using an external pressurization of a pressure-sensing element in conjunction with a shaft located in the element, the attributes of the invention are most advantageously utilized. Moreover, the transducer of the invention may also be used to compare differential pressures as the transducer element may be pressurized both internally and externally to result in an indication proportional to the difference in pressures acting upon the transducer-sensing element.

It is, therefore, a prime object of the invention to provide a transducer having a pressure-sensing element of superior characteristics which is free from distortion and damage from overpressurization, and permits savings in manufacturing and assembly cost, as well as providing improved physical and operating characteristics.

BRIEF DESCRIPTION OF THE DRAWINGS

The aforementioned advantages and objects of the invention will be appreciated from the following description and accompanying drawings wherein:

FIG. 1 is an elevational view of a tube blank from which a pressure-sensing element, in accord with the invention, may be manufactured, FIG. 2 is an end view of the blank of FIG. 1, FIG. 3 is an elevational view of a pressure-sensing element constructed in accord with the invention after fluting has occurred and prior to twisting of the element, FIG. 4 is a cross-sectional view taken along section IV—IV of FIG. 5, FIG. 5 is an elevational view of the element of FIG. 3 after twisting of the element has taken place, FIG. 6 is a sectional view taken along section VI—VI of FIG. 5, FIG. 7 is an elevational view of the preferred embodiment of a pressure-sensing element wherein the flutes are spirally formed in the blank, FIG. 8 is a sectional view of a transducer embodiment with which the fluted pressure-sensing element in accord with the invention may be utilized, as taken along section VIII—VIII of FIG. 9, FIG. 9 is a plan view as taken from the top of FIG. 8, FIG. 10 is an elevational, sectional view of another embodiment of pressure transducer in accord with the invention wherein a shaft is located in the pressure-sensing element, and the element is subjected to external pressures, FIG. 11 is a plan, sectional view taken along section XI—XI of FIG. 10 illustrating a normal operating, or at rest, condition of the pressure-sensing element, FIG. 12 is a view similar to FIG. 11 indicating the relationship between the flutes and the internal shaft upon overpressurization of the sensing element, and FIG. 13 is an elevational, sectional view of another transducer embodiment of the invention wherein the pressure-sensing element may be both interiorly and exteriorly pressurized.

DESCRIPTION OF THE PREFERRED EMBODIMENTS

The pressure-sensing element used with the transducer constructed in accord with the invention is best appreciated from FIGS. 1 through 7. Preferably, the pressure-sensing element is formed from a metallic seamless tube of thin wall material having a wall thickness which may range from .002 to .020 inch. One type of material which is acceptable is a stainless steel, commercially known under the trademark NiSpan-C.

FIG. 1 illustrates a cylindrical blank consisting of a seamless tube 10 having ends formed at right angles to the length of the tube. Reference locations 12 and 14 are indicated at opposite ends of the tube in order to illustrate the concept of twisting the tube, as will be later apparent. Due to the mode of manufacture of this type of tube the molecular stress lines occurring with the tube material will extend substantially parallel to the longitudinal axis of the material, and the tube wall thickness will be uniform through the tube length.

FIG. 3 represents the form of the blank after the flutes have been formed therein. The flutes 16 are of a linear concave configuration, as will be appreciated from FIGS. 4 and 6 whereby a cylindrical portion 18 results from the cylindrical configuration of the blank intermediate the flutes. The flutes terminate short of the blank ends, and the flutes shown in FIG. 3 will be formed substantially parallel to the axis of the blank 10 by any conventional manufacturing technique, such as by compression dies, or the like.

FIG. 5 illustrates the final form of the pressure element constructed from the shape shown in FIG. 3 whereby the form of FIG. 3 is twisted to give the flutes a spiral configuration. In FIG. 3 it will be noted that the reference locations 12 and 14 remain undisturbed from that of FIG. 1. However, in FIG. 5 the location 14 has been twisted at least 90° with respect to FIG. 3 and is no longer visible in the drawing. While the disclosed embodiments illustrate three flutes 16 formed in a blank, it will be appreciated that two flutes could be formed, or a number greater than the three defined, and it will be possible to form as many as six flutes in a tube of relatively limited diameter and provide the advantageous characteristics of the invention.

The preferred embodiment of the pressure-sensing element, in accord with the invention, is shown in FIG. 7. This embodiment is constructed from a blank identical to blank 10 shown in FIG. 1 wherein the stress lines of the blank will be extending parallel to the blank axis. However, in this embodiment the flutes 22 are formed in a spiral manner directly upon the blank and no twisting of the element takes place during manufacture, such as that which takes place between the steps shown in FIGS. 3 and 5 of the previously described embodiment. The formation of the flutes 22 results in peripheral portions 24 intermediate the flutes and the cross-sectional configurations of the embodiment of FIG. 7 are identical to those shown in FIGS. 4 and 6 when taken at corresponding axial locations. Reference location 26 corresponds to location 12 and reference location 28 corresponds to location 14, thus, it will be appreciated that no relative twisting occurs in the blank during the manufacture. As in the previously described embodiment, any conventional manufacturing technique may be used to form the flutes 22 in the spiraled manner.

In the embodiment of FIG. 7, the flutes 22 are obliquely related to the stress lines of the blank from which the element is formed as no twisting of the blank has taken place. It is believed that this fact produces the improved physical and operational characteristics as compared with the embodiment of FIG. 5, and it is for this reason that the embodiment of FIG. 7 is the preferred construction.

A pressure transducer utilizing the fluted pressure-sensing element, as described, is shown in FIG. 8 and includes an upper housing 30 to which a lower cylindrical housing 32 is attached. Threads 34 are formed upon the housing 32 whereby an appropriate fitting may be affixed to the transducer, or the transducer may be screwed into a threaded hole in a pressure vessel, or the like.

An inlet into the housing 32 is formed at 36, and the tubular fluted pressure-sensing element 38 is housed within the housing 32 having its lower end in communication with the inlet 36. The element 38 is soldered, or otherwise affixed, to the housing 32, as at 40. It will be noted that the flutes of element 38 spiral in the opposite direction from that of FIGS. 1 through 7 to illustrate that the flutes may be either right- or left-hand.

The upper end of the element is sealed by a combination shaft and cap 42 which is rotatably supported by a bearing 44 mounted upon the housing 30. A nut 46, threaded upon the shaft 42, supports an insulated washer assembly 48 which, in turn, mounts a potentiometer tap 50 which cooperates with a potentiometer bracket and coil 54 whereby the electrical characteristics of the potentiometer formed by the tap 50 and the coil 54 will be varied as the shaft 42 rotates due to twisting and untwisting of the element 38. Electrical conductors are connected to the tap 50 and the coil 54. This general type of transducer is shown in the assignee's United States Patent No. 3,346,830.

The introduction of a pressurized fluid into the inlet 36 will cause an untwisting of the fluted element 38 resulting in displacement of the tap 50 upon the coil 54 and, in this manner, a pressure indication is accomplished.

FIG. 10 illustrates the preferred embodiment of the transducer of the invention wherein external pressure is applied to the pressure-sensing element. In FIG. 10 the upper housing is indicated at 56 and the lower pressure-sensing element housing is indicated at 58 and this housing is of a tubular configuration defining a chamber therein. Threads 60 permit the transducer to be attached to a suitable conduit whereby pressurized fluid may enter the transducer chamber of housing 58 through an inlet 61.

The pressure-sensing element is indicated at 62, and the lower end of the element is closed by a cap 64, such as by soldering or brazing, and a shaft 66 is affixed to and extends from the cap 64 coaxial with the axis of the element 62. The shaft 68 extends through the other end of the element 62 terminating in an enlarged diameter configuration at 68.

The upper end of the element 62 includes a cap 70 which is affixed to the housing 58 as by soldering or brazing, and the upper end of the element 62 is firmly fixed to the cap 70 wherein the upper end of the element will be fixed with respect to the housings 56 and 58. It will be noted that the lower end of the element 62 adjacent the end of cap 64 is not supported and the fluid entering the bore 61 may freely enter the chamber of the housing 58.

An insulator assembly 74 is affixed to the upper shaft portion 68 and rotatable support of the shaft portion 68 is accomplished by antifriction bearings 76. A potentiometer tap 78 is mounted upon the shaft 68 by means of the insulator assembly 74 and the tap engages the resistance coil 80 in a manner similar to that shown in the embodiment of FIGS. 8 and 9.

Pressurized fluid enters the chamber of the housing 58 through inlet 61 and surrounds the pressure-sensing element 62. The existence of pressure upon the exterior of the element 62 higher than the pressure within the element causes the element to contract and, thus, contract the flutes 82 toward the axis of the element. FIG. 11 illustrates a normal condition of the element 62 wherein it will be appreciated that a radial clearance exists between the inner surface of the flutes 82 and the shaft 66. As the pressure fluctuation within the chamber of housing 58 occurs within the operating limits of the transducer, the contraction and expansion of the element 62 will produce a twisting and untwisting of the element throughout its length. In that the element 62 is affixed to the housing 58 by the cap 70, and as the shaft 66 is attached to the lower end of the element 62 for rotation therewith, the shaft 66 will rotate resulting in displacement of the tap 78 upon the coil 80 proportional to the pressure within the housing 58.

Should the pressure within the housing 58 become great enough, a contraction of the element will occur such as shown in FIG. 12. Extreme pressures could cause the metal of the element to be stretched beyond its elastic limit and thereby destroy the functioning of the transducer. However, due to the presence of the shaft 66, the inner surface of the flutes 82 will engage the shaft, FIG. 12, and further radial contraction of the flutes and the element 62 is prevented. Thus, the presence of the shaft 66 serves as an automatic means for preventing damage to the element 62 due to overpressure, and the diameter of the shaft 66 is such as to restrain collapse of the element 62 prior to the elastic limit being exceeded.

The embodiment illustrated in FIG. 13 is similar to to that shown in FIG. 10 and similar components are indicated by primes. In this embodiment, the element 62' is provided with an upper cap 84 which is affixed to the housing 58' at a position lower, or spaced from the portion 68' to a greater extent than the embodiment of FIG. 10. A bore 86 is formed in the housing 56' communicating with the chamber 88 between the cap 84 and a seal 90 which prevents the escape of pressurized fluid from the chamber 88. A fitting 92 is threaded into a threaded bore defined in the housing 56' communicating with bore 86 and, in this manner, a pressurized fluid may be introduced into the chamber 88. As a clearance exists between the shaft 66' and the bore in cap 84, fluid pressure within the chamber 88 will communicate with the interior of the pressure-sensing element 62' and, in this manner, a differential pressure comparison can be made between the pressure existing within the chamber of the housing 58' and that existing within the chamber 88. Of course, it will be appreciated that the presence of the shaft 66 to prevent damage to the pressure-sensing element due to overpressurization thereof is effective only against overpressurization from an external pressure source.

The fluted pressure-sensing element described above is capable of sensing lower pressures than those twisted Bourdon tube type pressure sensors contructed in the conventional manner. For instance, the fluted pressure-sensing element can be used effectively with pressures as low as 4 p.s.i., while a twisted conventional Bourdon tube is not accurate nor effective below 25 p.s.i.

It is believed that, because the fluted pressure-sensing element disposes the flutes obliquely with respect to the stress lines of the tube material, more angular travel results than that produced from conventional twisted Bourdon tubes for similar pressures and dimensions, and it is also believed that this relationhip to the material stress lines results in the better temperature characteristics derived from this type of pressure-sensing element.

It is appreciated that various modifications to the inventive concept may be apparent to those skilled in the art without departing from the spirit and scope thereof.

What is claimed is:

1. A pressure transducer comprising, in combination, a fluid-tight pressure-sensing element housing defining a chamber having a pressure inlet defined therein, an elongated tubular pressure-sensing element mounted within said housing chamber, said element having a first end and a closed second end, said element having longitudinally extending spirally defined flutes spiraling about the axis thereof, a shaft located within said element having a first end extending from said element first end and a second end affixed to said element second end, means affixing said element first end with respect to said housing, said element first end being sealed from communication with said housing chamber, and indicating means connected to said shaft first end rotating with said shaft upon pressure within said chamber acting upon the exterior of said sensing element.

2. A pressure transducer as in claim 1 wherein said shaft includes a cylindrical portion in axial alignment with said flutes, said shaft portion being of sufficient diameter to be engaged by the inner surface of said element flutes prior to said element and flutes radially contracting under high pressure beyond the elastic limit of the material of said element.

3. A pressure transducer as in claim 1 wherein said indicating means comprises a potentiometer having a tap and a resistance element, said tap being connected to said shaft first end.

4. In a pressure transducer as in claim 1, a second pressure inlet communicating with the interior of said pressure-sensing element whereby the interior of said element may be pressurized.

5. In a pressure transducer as in claim 1 wherein said pressure-sensing element is formed of tubing having stress lines substantially parallel to the axis of said element, said flutes being obliquely disposed to and extending across said stress lines.

References Cited

UNITED STATES PATENTS 2,877,326 3/1959 Bourns _____ 73—418 XR
3,411,362 11/1968 Arasim _____ 73—398

DONALD O. WOODIEL, Primary Examiner

U.S. Cl. X.R.

73—418